(12) United States Patent
Ahn et al.

(10) Patent No.: US 9,208,949 B2
(45) Date of Patent: Dec. 8, 2015

(54) MULTILAYER CERAMIC CAPACITOR

(71) Applicant: SAMSUNG ELECTRO-MECHANICS CO., LTD., Suwon-Si, Gyeonggi-Do (KR)

(72) Inventors: Young Ghyu Ahn, Suwon-Si (KR); Sang Soo Park, Suwon-Si (KR); Hwi Geun Im, Suwon-Si (KR); Hyun Tae Kim, Suwon-Si (KR); Soon Ju Lee, Suwon-Si (KR); Heung Kil Park, Suwon-Si (KR); Byoung Hwa Lee, Suwon-Si (KR); Min Cheol Park, Suwon-Si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 85 days.

(21) Appl. No.: 14/209,420

(22) Filed: Mar. 13, 2014

(65) Prior Publication Data
US 2015/0124370 A1  May 7, 2015

(30) Foreign Application Priority Data

Nov. 5, 2013 (KR) .................. 10-2013-0133450

(51) Int. Cl.
| | |
|---|---|
| *H01G 4/12* | (2006.01) |
| *H01G 4/224* | (2006.01) |
| *H01G 4/232* | (2006.01) |
| *H01G 4/30* | (2006.01) |
| *H01G 4/228* | (2006.01) |

(52) U.S. Cl.
CPC ................ *H01G 4/224* (2013.01); *H01G 4/12* (2013.01); *H01G 4/228* (2013.01); *H01G 4/232* (2013.01); *H01G 4/30* (2013.01)

(58) Field of Classification Search
CPC ........... H01G 4/12; H01G 4/30; H01G 4/228; H01G 4/232; H01G 9/012
USPC ............. 361/306.3, 301.2, 301.4, 306.1, 309, 361/311–313, 321.1, 321.2
See application file for complete search history.

(56) References Cited

U.S. PATENT DOCUMENTS

| | | | | |
|---|---|---|---|---|
| 6,320,738 | B1 * | 11/2001 | Yamana et al. | 361/321.2 |
| 6,522,521 | B2 * | 2/2003 | Mizuno et al. | 361/321.4 |
| 7,659,568 | B2 * | 2/2010 | Kusano et al. | 257/307 |
| 7,745,869 | B2 * | 6/2010 | Sakashita | 257/310 |
| 8,050,045 | B2 * | 11/2011 | Okuzawa et al. | 361/763 |
| 8,631,549 | B2 * | 1/2014 | Motoki et al. | 29/25.42 |
| 2012/0134066 | A1 | 5/2012 | Kim et al. | |

FOREIGN PATENT DOCUMENTS

| | | |
|---|---|---|
| KR | 10-2012-0031235 A | 3/2012 |
| KR | 10-2012-0056549 A | 6/2012 |
| WO | 2011/002982 A2 | 1/2011 |

* cited by examiner

*Primary Examiner* — Nguyen T Ha
(74) *Attorney, Agent, or Firm* — McDermott Will & Emery LLP

(57) ABSTRACT

A multilayer ceramic capacitor may include a ceramic body having a plurality of dielectric layers; first and second internal electrodes disposed in the ceramic body to be alternately exposed to the first and second end surfaces of the ceramic body, having the dielectric layers interposed therebetween; and first and second external electrodes electrically connected to the first and second internal electrodes, respectively. The first and second external electrodes may include: first and second internal conductive layers; first and second insulating layers; and first and second external conductive layers.

13 Claims, 4 Drawing Sheets

MULTILAYER CERAMIC CAPACITOR

CROSS-REFERENCE TO RELATED APPLICATION

This application claims the benefit of Korean Patent Application No. 10-2013-0133450 filed on Nov. 5, 2013, with the Korean Intellectual Property Office, the disclosure of which is incorporated herein by reference.

BACKGROUND

The present disclosure relates to a multilayer ceramic capacitor.

As electronic components using a ceramic material, there are a capacitor, an inductor, a piezoelectric element, a varistor, a thermistor, and the like.

Among these ceramic electronic components, a multilayer ceramic capacitor (MLCC) is an electronic component having advantages such as miniaturization, high capacity, and easiness of mounting.

The multilayer ceramic capacitor is a chip shaped condenser mounted on circuit boards of various electronic products such as a display device, for example, a liquid crystal display (LCD), a plasma display panel (PDP), or the like, a computer, a personal digital assistants (PDA), a mobile phone, and the like, to serve to charge electricity or discharge electricity.

Recently, due to an increase in a size of display devices, an increase in a speed of a central processing unit (CPU), or the like, a severe heat generation defect has occurred in the electronic device.

Therefore, in the multilayer ceramic capacitor, the securing of sufficient capacitance and reliability is required even at a high temperature for a stable operation of an integrated circuit (IC) installed in the electronic device.

Such a multilayer ceramic capacitor may have a structure in which a plurality of dielectric layers are stacked while internal electrodes having different polarities are alternately disposed with the respective dielectric layers interposed therebetween.

In this case, since the dielectric layers have piezoelectricity, when direct current (DC) or alternate current (AC) voltage is applied to the multilayer ceramic capacitor, a piezoelectric phenomenon is generated between the internal electrodes, thereby generating periodic vibrations while a volume of a ceramic body is expanded and contracted according to a frequency.

The vibrations are transferred to a printed circuit board through an external electrode of the multilayer ceramic capacitor and a soldering material connecting the external electrode to the printed circuit board at the time of mounting the multilayer ceramic capacitor on the board, such that the entire printed circuit board may become an acoustic reflective surface to generate a vibration sound, which is noise.

This vibration sound may have a frequency corresponding to an audio frequency in a region of 20 to 20,000 Hz, which may cause listener discomfort and is referred to as acoustic noise.

Recently, in electronic devices, since acoustic noise generated in the multilayer ceramic capacitor as described above may become prominent due to a noise reduction of components, research into a technology of effectively decreasing acoustic noise generated in the multilayer ceramic capacitor has been required.

As a method of decreasing acoustic noise, a method of attaching a metal terminal having a frame shape to both end surface of a multilayer ceramic capacitor to thereby mount the multilayer ceramic capacitor so as to be spaced apart from a printed circuit board by a predetermined interval has been disclosed.

However, in order to decrease the acoustic noise to a predetermined level using the metal terminal, a height of the metal terminal needs to be increased to a level more than a predetermined standard.

In this case, since an increase in the height of the metal terminal may increase a height of a component in which the multilayer ceramic capacitor is mounted, thereby leading to an inability to be used in a product having a height limitation.

SUMMARY

An exemplary embodiment of the present disclosure may provide a multilayer ceramic capacitor capable of effectively reducing acoustic noise generated due to vibrations being transferred to a printed circuit board, the vibrations being generated by a piezoelectric phenomenon in the multilayer ceramic capacitor.

According to an exemplary embodiment of the present disclosure, a multilayer ceramic capacitor may include: a ceramic body including a plurality of dielectric layers and having first and second main surfaces opposing each other in a thickness direction, first and second end surfaces opposing each other in a length direction, and first and second side surfaces opposing each other in a width direction; a plurality of first and second internal electrodes disposed in the ceramic body to be alternately exposed to the first and second end surfaces of the ceramic body, having the dielectric layers interposed therebetween; and first and second external electrodes electrically connected to the first and second internal electrodes, respectively, wherein the first and second external electrodes includes: first and second internal conductive layers extended from the first and second end surfaces of the ceramic body to portions of the first main surface, respectively; first and second insulating layers extended from the first and second internal conductive layers on the first and second end surfaces to portions of the first and second internal conductive layers on the first main surface, respectively, and having a length shorter than that of the first and second internal conductive layers in such a manner that portions of the first and second internal conductive layers are exposed to the first main surface; and first and second external conductive layers formed on the first and second internal conductive layers on the first main surface, respectively.

According to exemplary embodiment of the present disclosure, a multilayer ceramic capacitor may include: a ceramic body including a plurality of dielectric layers and having first and second main surfaces opposing each other in a thickness direction, first and second end surfaces opposing each other in a length direction, and first and second side surfaces opposing each other in a width direction; a plurality of first and second internal electrodes disposed in the ceramic body to be alternately exposed to the first and second end surfaces of the ceramic body, having the dielectric layers interposed therebetween; and first and second external electrodes electrically connected to the first and second internal electrodes, respectively, wherein the first and second external electrodes respectively includes: first and second internal conductive layers extended from the first and second end surfaces of the ceramic body to portions of the first main surface, respectively; first and second insulating layers formed on the first and second internal conductive layers on the first main surface, respectively, while having a width narrower than that of the first and second internal conductive layers so as to expose portions of the first and second internal conductive layers; and first and second external conductive layers formed on the first and second internal conductive layers on the first main surface, respectively.

The first and second external conductive layers may be simultaneously formed on the first internal conductive layer and the first insulating layer on the first main surface, and the second internal conductive layer and the second insulating layer on the first main surface, respectively.

The multilayer ceramic capacitor may further include a third insulating layer formed on the first main surface of the ceramic body to connect the first and second insulating layers to each other.

The first and second insulating layers may be extended from the first and second internal conductive layers on the first main surface to portions of the first and second end surfaces, respectively.

The first and second external conductive electrodes may be extended from the first and second internal conductive layers on the first main surface to portions of the first and second side surfaces, respectively.

The first and second insulating layers may have a thickness of 50 μm or more.

The first and second insulating layers may be formed of a material containing an insulating epoxy.

The first and second external conductive layers may be formed of a material containing a conductive epoxy.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
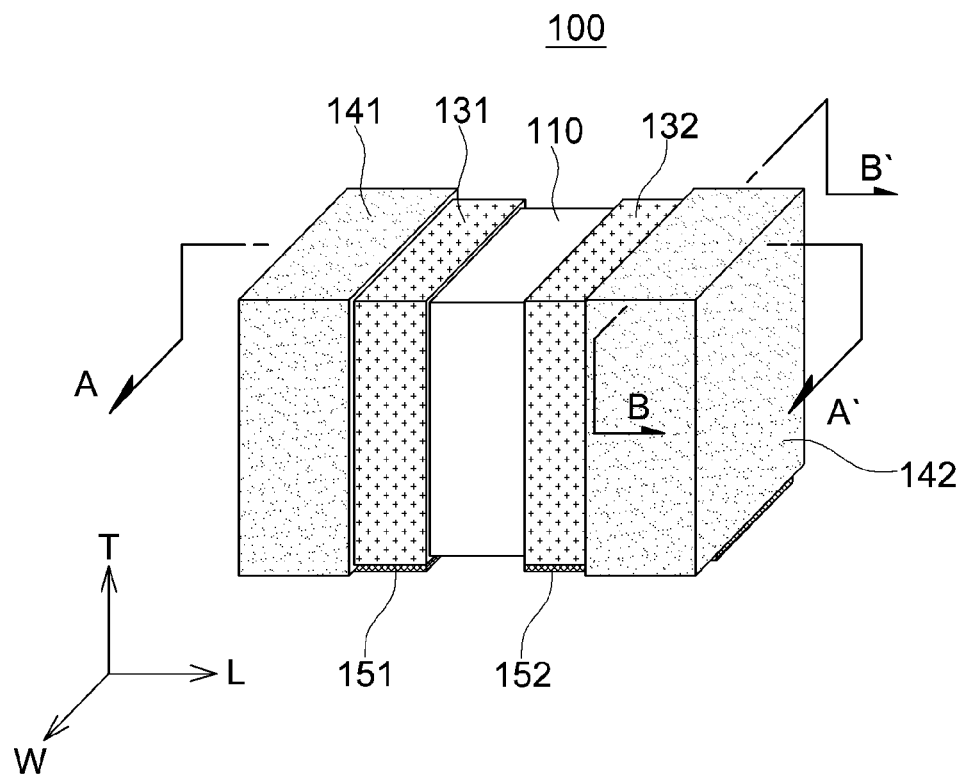
FIG. 1 is a perspective view showing a schematic structure of a multilayer ceramic capacitor according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein.

Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

The present disclosure relates to a multilayer ceramic electronic component. Examples of the multilayer ceramic electronic component according to an exemplary embodiment of the present disclosure may include a multilayer ceramic capacitor, an inductor, a piezoelectric element, a varistor, a chip resistor, a thermistor, and the like. Hereinafter, a multilayer ceramic capacitor will be described as an example of the multilayer ceramic electronic component.

In addition, directions of a hexahedron will be defined in order to clearly describe exemplary embodiments of the present disclosure. L, W and T shown in FIG. 1 refer to a length direction, a width direction, and a thickness direction, respectively, of the hexahedron.

Here, the thickness direction may be used to have the same concept as that of a direction in which dielectric layers are stacked.

Figure 2:
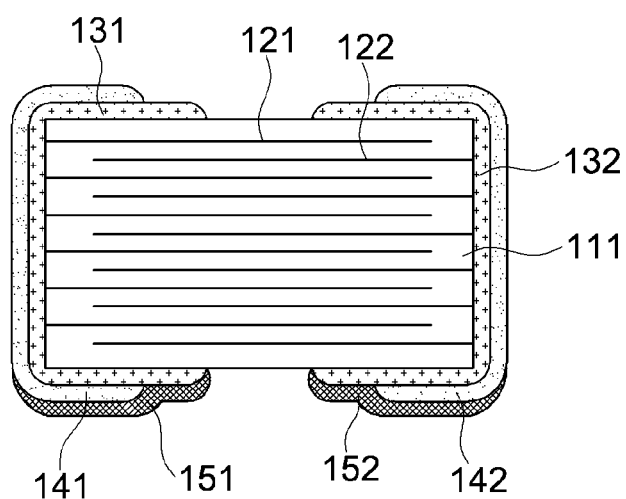
FIG. 2 is a cross-sectional view taken along line A-A' of FIG. 1.

FIG. 1 is a perspective view showing a schematic structure of a multilayer ceramic capacitor according to an exemplary embodiment of the present disclosure, and FIG. 2 is a cross-sectional view taken along line A-A' of FIG. 1.

Referring to FIGS. 1 and 2, a multilayer ceramic capacitor 100 according to an exemplary embodiment of the present disclosure may include a ceramic body 110 in which a plurality of dielectric layers 111 are stacked in the thickness direction, a plurality of first and second internal electrodes 121 and 122, and first and second external electrodes electrically connected to the first and second internal electrodes 121 and 122, respectively.

The ceramic body 110 may be formed by stacking the plurality of dielectric layers 111 and then sintering the stacked dielectric layers, and the dielectric layers 111 may be integrated so as not to confirm a boundary between the dielectric layers 111 adjacent to each other.

In addition, the ceramic body 110 may have a hexahedral shape.

In the exemplary embodiment, surfaces of the ceramic body 110, opposing each other in the thickness direction, that is, a direction in which the dielectric layers 111 are stacked, may be defined as first and second main surfaces, end surfaces of the ceramic body 110, connecting the first and second main surfaces to each other and opposing each other in the length direction may be defined as first and second end surfaces, and side surfaces of the ceramic body 110, opposing each other in the width direction may be defined as first and second side surfaces.

The dielectric layers 111 may contain a ceramic material having high permittivity, for example, a barium titanate (BaTiO$_3$) based ceramic powder, or the like, but the present disclosure is not limited thereto as long as sufficient capacitance may be obtained.

In addition, if necessary, the dielectric layers 111 may further contain various types of ceramic additive such as a transition metal oxide or carbide, a rare earth element, magnesium (Mg), aluminum (Al), or the like, an organic solvent, a plasticizer, a binder, a dispersant, and the like, in addition to the ceramic powder.

The first and second internal electrodes 121 and 122, electrodes having different polarities, may be formed and stacked on at least one surface of a ceramic sheet forming the dielectric layer 111 and be alternately exposed to the first and second end surfaces of the ceramic body 110, having each dielectric layer 111 interposed therebetween in the ceramic body 110.

In this case, the first and second internal electrodes 121 and 122 may be electrically insulated from each other by the dielectric layer disposed therebetween, and capacitance of the multilayer ceramic capacitor 100 may be in proportion to an area of an overlapped portion between the first and second internal electrodes 121 and 122 in the direction in which the dielectric layers 111 are stacked.

In addition, the first and second internal electrodes 121 and 122 may be formed of a conductive metal, for example, any one of silver (Ag), lead (Pb), platinum (Pt), nickel (Ni), and copper (Cu), an alloy thereof, or the like, but the present disclosure is not limited thereto.

Figure 3:
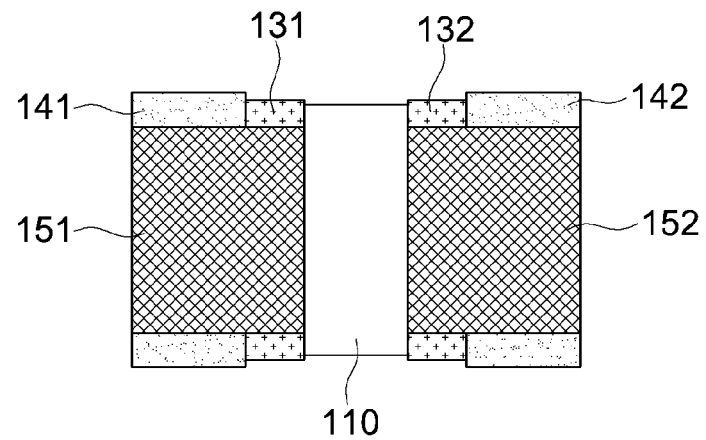
FIG. 3 is a bottom view of FIG. 1.
Figure 4:
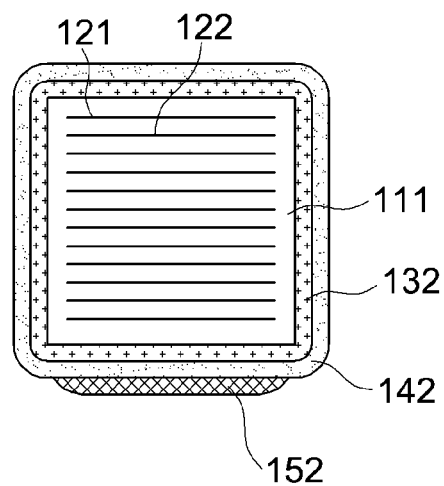
FIG. 4 is a cross-sectional view taken along line B-B' of FIG. 1.

FIG. 3 is a bottom view of the multilayer ceramic capacitor according to an exemplary embodiment of the present disclosure, and FIG. 4 is a cross-sectional view taken along line B-B' of FIG. 1.

Referring to FIGS. 3 and 4, the first and second external electrodes may include first and second internal conductive layers 131 and 132, first and second insulating layers 141 and 142, and first and second external conductive layers 151 and 152.

In an exemplary embodiment, the first and second internal conductive layers 131 and 132 may be extended from the first and second end surfaces of the ceramic body 110 to portions of the first main surface, a mounting surface, such that the first and second internal conductive layers 131 and 132 cover the plurality of first and second internal electrodes 121 and 122 alternately exposed to the first and second end surfaces of the ceramic body to thereby be electrically connected thereto, in a cross-section of the ceramic body 110 in a width-thickness (W-T) direction.

Further, the first and second internal conductive layers 131 and 132 may be extended from the first and second end surfaces of the ceramic body 110 to portions of the second main surface or the first and second side surfaces of the ceramic body 110 in order to suppress moisture or a plating solution from infiltrating into the internal electrodes at the time of forming first and second plating layers to be described below.

In this case, the first and second internal conductive layers 131 and 132 may be formed using a copper-glass (Cu-glass) paste in order to provide high reliability such as excellent heat cycle resistance, moisture resistance, and the like, while having excellent electrical properties, but the present disclosure is not limited thereto.

The first and second insulating layers 141 and 142 may be formed on the first and second internal conductive layers 131 and 132 and may allow solder not to be formed or to be minimized on circumferential surfaces except for mounting surfaces of the first and second external electrodes at the time of mounting the multilayer ceramic capacitor 100 on a printed circuit board, or the like, as well as suppressing moisture or a plating solution from infiltrating into the internal electrodes at the time of forming first and second plating layers to be described below.

The first and second insulating layers 141 and 142 as described above may be formed on the first and second internal conductive layers 131 and 132 to be extended from the first and second end surfaces to portions of the first main surface, while having a length shorter than a length of the first and second internal conductive layers 131 and 132 formed on the first main surface in such a manner that portions of the respective first and second internal conductive layers 131 and 132 are exposed to the first main surface.

In addition, if necessary, the first and second insulating layers 141 and 142 may be extended to portions of the first and second internal conductive layers 131 and 132 on the first and second side surfaces, respectively.

In this case, the first and second insulating layers 141 and 142 may be formed using an epoxy resist having insulating properties, or the like, but the present disclosure is not limited thereto.

In addition, the first and second insulating layers 141 and 142 may be formed by one of a wheel coating method, a method of forming grooves in surfaces of the first and second internal conductive layers 131 and 132, filling the grooves with an insulating epoxy paste, or the like, and then transferring the paste, a screen printing method, and the like.

Referring to the following Table 1, the first and second insulating layers 141 and 142 may have a thickness of 50 μm or more in a similar manner to the case of samples 3 to 7 in order to decrease a vibration sound.

The reason for this is that in the case in which the thickness of the first and second insulating layers 141 and 142 is less than 50 μm, for example, in the cases of samples 1 and 2, since a sufficient separation distance between the multilayer ceramic capacitor 100 and the board was not secured at the time of mounting the multilayer ceramic capacitor on a board, a vibration sound of 30 dB or more was generated, such that effects of decreasing a vibration transfer was insignificant.

TABLE 1

| # | Thickness (μm) of Insulating Layer | Vibration Sound (dB) |
| --- | --- | --- |
| 1 | 10.2 | 36.4 |
| 2 | 30.5 | 34.2 |
| 3 | 50.0 | 22.5 |
| 4 | 75.7 | 20.6 |
| 5 | 100.2 | 19.7 |
| 6 | 149.6 | 19.0 |
| 7 | 201.7 | 18.4 |

The first and second external conductive layers 151 and 152 may be respectively formed on exposed portions of the first and second internal conductive layers 131 and 132 on the first main surface, and serve as external connection terminals attached to a printed circuit board or the like by solder at the time of mounting the multilayer ceramic capacitor on the printed circuit board.

In addition, the mounting surface of the multilayer ceramic capacitor 100 may be clearly distinguished by the first and second external conductive layers 151 and 152, thereby protecting the multilayer ceramic capacitor 100 from being mounted in a vertically reversed manner.

In this case, the first and second external conductive layers 151 and 152 may be formed, for example, using a copper-epoxy (Cu-epoxy) paste, or the like, capable of absorbing mechanical stress to improve reliability while having excellent conductivity, but the present disclosure is not limited thereto.

Further, the first and second external conductive layers 151 and 152 may be simultaneously attached to the first internal conductive layer 131 and the first insulating layer 141 on the first main surface, and the second internal conductive layer 132 and the second insulating layer 142 on the first main surface, respectively.

Meanwhile, plating layers may be formed on the first and second external conductive layers 151 and 152, respectively.

The plating layers may include a nickel (Ni) plating layer formed on the first and second external conductive layers 151 and 152 and a tin (Sn) plating layer formed on the nickel plating layer.

The plating layers may be provided to increase adhesion strength between the multilayer ceramic capacitor 100 and the printed circuit board at the time of mounting the multilayer ceramic capacitor 100 on the printed circuit board, or the like, by solder.

The first and second external electrodes configured as described above may significantly decrease a height of a solder fillet formed at the time of mounting the multilayer ceramic capacitor on the printed circuit board due to the first and second insulating layers 141 and 142 formed on the first and second end surfaces or first and second side surfaces of the ceramic body 110 to thereby significantly decrease vibrations transferred to the board through the solder fillet. The first and second insulating layers 141 and 142 may have flexible characteristics, such that additional effects capable of absorbing vibrations may be expected.

In addition, an interval between the multilayer ceramic capacitor 100 and the printed circuit board may be increased due to thicknesses of the first and second insulating layers 141 and 142 and the first and second external conductive layers 151 and 152 formed in a stepped manner on the first main surface, which is the mounting surface of the ceramic body 110, thereby decreasing a vibration transfer at the time of mounting the multilayer ceramic capacitor 100 on the printed circuit board.

Figure 5:
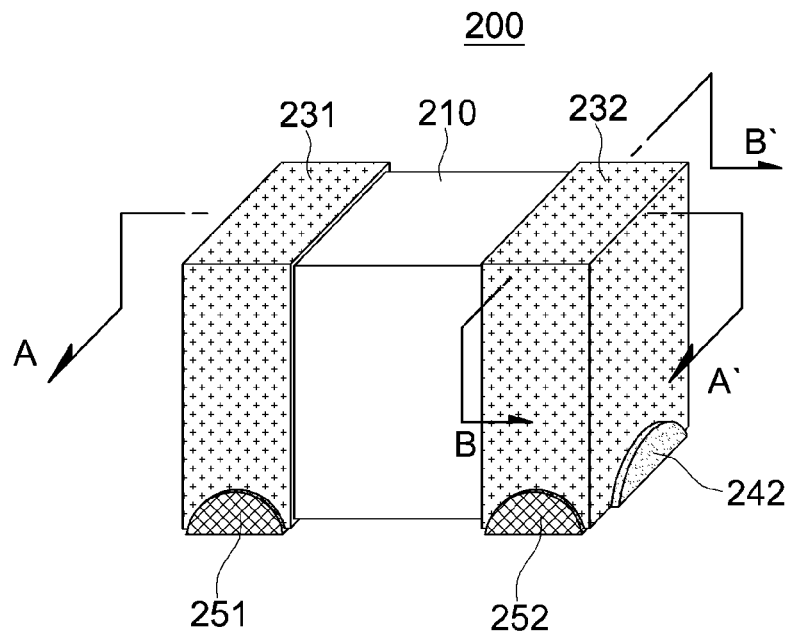
FIG. 5 is a perspective view showing a schematic structure of a multilayer ceramic capacitor according to another exemplary embodiment of the present disclosure.
Figure 6:
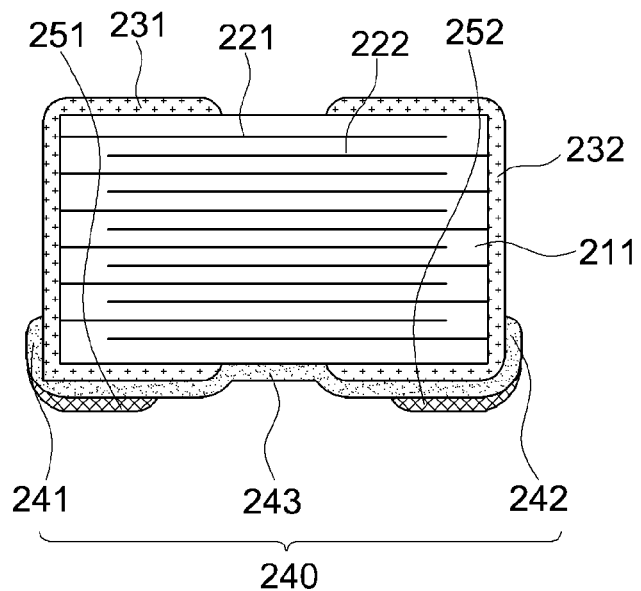
FIG. 6 is a cross-sectional view taken along line A-A' of FIG. 5.

FIG. 5 is a perspective view showing a schematic structure of a multilayer ceramic capacitor according to another exemplary embodiment of the present disclosure, and FIG. 6 is a cross-sectional view taken along line A-A' of FIG. 5.

Referring to FIGS. 5 and 6, a multilayer ceramic capacitor 200 according to another exemplary embodiment of the present disclosure may include a ceramic body 210 in which a plurality of dielectric layers 211 are stacked in the thickness direction, a plurality of first and second internal electrodes 221 and 222, and first and second external electrodes electrically connected to the first and second internal electrodes 221 and 222, respectively.

Here, since structures of the ceramic body 210 and the first and second internal electrodes 221 and 222 are similar to those in the above-mentioned exemplary embodiment, a detailed description thereof will be omitted in order to avoid an overlapped description, and the first and second external electrodes having a different structure from that in the above-mentioned exemplary embodiment will be described in detail based on the accompanying drawings.

Figure 7:
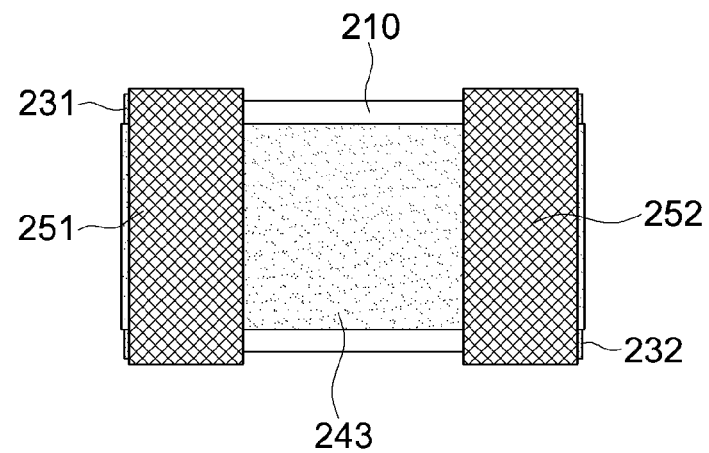
FIG. 7 is a bottom view of FIG. 5.
Figure 8:
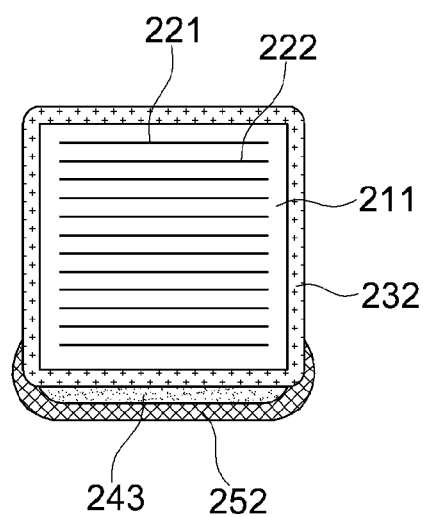
FIG. 8 is a cross-sectional view taken along line B-B' of FIG. 5.

FIG. 7 is a bottom view of the multilayer ceramic capacitor according to another exemplary embodiment of the present disclosure, and FIG. 8 is a cross-sectional view taken along line B-B' of FIG. 5.

Referring to FIGS. 7 and 8, the first and second external electrodes may include first and second internal conductive layers 231 and 232, first and second insulating layers 241 and 242, and first and second external conductive layers 251 and 252.

In this exemplary embodiment, the first and second internal conductive layers 231 and 232 may be extended from the first and second end surfaces of the ceramic body 210 to portions of the first main surface, a mounting surface, to cover the plurality of first and second internal electrodes 221 and 222 alternately exposed to the first and second end surfaces of the ceramic body 210, thereby being electrically connected thereto, in a cross-section of the ceramic body 210 in a width-thickness (W-T) direction.

In addition, if necessary, the first and second internal conductive layers 231 and 232 may be formed to be extended from the first and second end surfaces of the ceramic body 210 to portions of the first and second side surfaces thereof.

Further, the first and second internal conductive layers 231 and 232 may be extended from the first and second end surfaces of the ceramic body 210 to portions of the second main surface or the first and second side surfaces of the ceramic body 210 in order to suppress moisture or a plating solution from infiltrating into the internal electrode at the time of forming first and second plating layers to be described below.

In this case, the first and second internal conductive layers 231 and 232 may be formed using a copper-glass (Cu-glass) paste in order to provide high reliability such as excellent heat cycle resistance, moisture resistance, and the like, while having excellent electrical properties, but the present disclosure is not limited thereto.

The first and second insulating layers 241 and 242 may be formed on the first and second internal conductive layers 231 and 232 and suppress moisture or the plating solution from infiltrating into the internal electrode at the time of forming first and second plating layers to be described below, as well as having flexible characteristics, such that additional effects capable of absorbing vibrations may be expected.

The first and second insulating layers 241 and 242 as described above may formed on the first and second internal conductive layers 231 and 232 on the first main surface, while having a width narrower than that of the first and second internal conductive layers 231 and 232 so as to expose portions of the first and second internal conductive layers 231 and 232 formed on the first main surface.

In addition, if necessary, the first and second insulating layers 241 and 242 may be formed on the first and second internal conductive layers 231 and 232 so that both end portions thereof are extended from the first main surface to portions of the first and second side surfaces, respectively.

In this case, the first and second insulating layers 241 and 242 may be formed using an epoxy resist having insulating properties, or the like, but the present disclosure is not limited thereto.

In addition, the first and second insulating layers 241 and 242 may be formed by one of a wheel coating method, a method of forming grooves in surfaces of the first and second internal conductive layers 231 and 232, filling the grooves with an insulating epoxy paste, or the like, and then transferring the paste, a screen printing method, and the like.

Further, the first and second insulating layers 241 and 242 may have a thickness of 50 µm or more.

The reason for this is that in the case in which the thickness of the first and second insulating layers 241 and 242 is less than 50 µm, a sufficient separation distance between the multilayer ceramic capacitor 200 and the board was not secured at the time of mounting the multilayer ceramic capacitor on a board, such that effects of decreasing a vibration transfer may be insufficient.

Meanwhile, a third insulating layer 243 may be formed on the first surface of the ceramic body 210 to connect the first and second insulating layers 241 and 242 to each other in the length direction. In this exemplary embodiment, the first to third insulating layers 241 to 243 may configure a single insulating layer 240.

The first and second external conductive layers 251 and 252 may be connected to exposed portions of the first and second internal conductive layers 231 and 232 on the first main surface, the exposed portion not being covered by the first and second insulating layers 241, and may serve as external connection terminals attached to a printed circuit board, or the like by solder at the time of mounting the multilayer ceramic capacitor on the board.

In this case, the first and second external conductive layers 251 and 252 may be formed on the first main surface in the width direction of the ceramic body and be extended to portions of the first and second internal conductive layers 231 and 232 on the first and second side surfaces, respectively.

In addition, the mounting surface of the multilayer ceramic capacitor 200 may be clearly distinguished by the first and second external conductive layers 251 and 252, thereby protecting the multilayer ceramic capacitor 200 from being mounted in a vertically reversed manner.

In this case, the first and second external conductive layers 251 and 252 may be formed, for example, using a copper-epoxy (Cu-epoxy) paste, or the like, capable of absorbing mechanical stress to improve reliability while having excellent conductivity, but the present disclosure is not limited thereto.

Further, the first and second external conductive layers 251 and 252 may be simultaneously attached to the first internal conductive layer 231 and the first insulating layer 241 on the first main surface, and the second internal conductive layer 232 and the second insulating layer 242 on the first main surface, respectively.

Meanwhile, plating layers may be formed on the respective first and second external conductive electrodes 251 and 252.

The plating layers may include a nickel (Ni) plating layer formed on the first and second external conductive layers 251 and 252 and a tin (Sn) plating layer formed on the nickel plating layer.

The plating layers may be provided to increase adhesion strength between the multilayer ceramic capacitor 200 and the printed circuit board at the time of mounting the multilayer ceramic capacitor 200 on the printed circuit board, or the like, by solder.

The first and second external electrodes configured as described above may increase an interval between the multilayer ceramic capacitor 200 and the printed circuit board due to thicknesses of the first and second insulating layers 241 and 242 and the first and second external conductive layers 251 and 252 formed in a stepped manner on the first main surface, which is the mounting surface of the ceramic body 210, thereby decreasing a vibration transfer at the time of mounting the multilayer ceramic capacitor 200 on the printed circuit board.

As set forth above, according to exemplary embodiments of the present disclosure, the interval between the multilayer ceramic capacitor and the printed circuit board may be increased at the time of mounting the multilayer ceramic capacitor on the printed circuit board due to thicknesses of the first and second insulating layers and the first and second external conductive layers formed in a stepped manner on the first main surface, which is the mounting surface of the ceramic body, such that vibrations transferred to the printed circuit board may be decreased, thereby decreasing acoustic noise.

Further, the insulating layer of the external electrode may have flexible characteristics, such that additional effects capable of absorbing vibrations may be expected.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic capacitor comprising:
a ceramic body including a plurality of dielectric layers and having first and second surfaces opposing each other in a thickness direction, first and second end surfaces opposing each other in a length direction, and first and second side surfaces opposing each other in a width direction;
first and second internal electrodes disposed in the ceramic body to be alternately exposed to the first and second end surfaces of the ceramic body, having the dielectric layers interposed therebetween; and
first and second external electrodes electrically connected to the first and second internal electrodes, respectively, wherein the first and second external electrodes includes:
first and second internal conductive layers extended from the first and second end surfaces of the ceramic body to portions of the first surface, respectively;
first and second insulating layers extended from the first and second internal conductive layers on the first and second end surfaces to portions of the first and second internal conductive layers on the first surface, respectively, and having a length shorter than that of the first and second internal conductive layers in such a manner that portions of the first and second internal conductive layers are exposed to the first surface; and
first and second external conductive layers formed on the first and second internal conductive layers on the first surface, respectively.

2. The multilayer ceramic capacitor of claim 1, wherein the first and second external conductive layers are simultaneously formed on the first internal conductive layer and the first insulating layer on the first surface, and the second internal conductive layer and the second insulating layer on the first surface, respectively.

3. The multilayer ceramic capacitor of claim 1, wherein the first and second insulating layers have a thickness of 50 μm or more.

4. The multilayer ceramic capacitor of claim 1, wherein the first and second insulating layers contain an insulating epoxy.

5. The multilayer ceramic capacitor of claim 1, wherein the first and second external conductive layers contain a conductive epoxy.

6. A multilayer ceramic capacitor comprising:
a ceramic body including a plurality of dielectric layers and having first and second surfaces opposing each other in a thickness direction, first and second end surfaces opposing each other in a length direction, and first and second side surfaces opposing each other in a width direction;
first and second internal electrodes disposed in the ceramic body to be alternately exposed to the first and second end surfaces of the ceramic body, having the dielectric layers interposed therebetween; and
first and second external electrodes electrically connected to the first and second internal electrodes, respectively, wherein the first and second external electrodes respectively includes:
first and second internal conductive layers extended from the first and second end surfaces of the ceramic body to portions of the first surface, respectively;
first and second insulating layers formed on the first and second internal conductive layers on the first surface, respectively, while having a width narrower than that of the first and second internal conductive layers so as to expose portions of the first and second internal conductive layers; and
first and second external conductive layers formed on the first and second internal conductive layers on the first surface, respectively.

7. The multilayer ceramic capacitor of claim 6, wherein the first and second external conductive layers are simultaneously formed on the first internal conductive layer and the first insulating layer on the first surface, and the second internal conductive layer and the second insulating layer on the first surface, respectively.

8. The multilayer ceramic capacitor of claim 6, further comprising a third insulating layer formed on the first surface of the ceramic body to connect the first and second insulating layers to each other.

9. The multilayer ceramic capacitor of claim 6, wherein the first and second insulating layers are extended from the first and second internal conductive layers on the first surface to portions of the first and second end surfaces, respectively.

10. The multilayer ceramic capacitor of claim 6, wherein the first and second external conductive layers are extended from the first and second internal conductive layers on the first surface to portions of the first and second side surfaces, respectively.

11. The multilayer ceramic capacitor of claim 6, wherein the first and second insulating layers have a thickness of 50 μm or more.

12. The multilayer ceramic capacitor of claim 6, wherein the first and second insulating layers contain an insulating epoxy.

13. The multilayer ceramic capacitor of claim 6, wherein the first and second external conductive layers contain a conductive epoxy.

* * * * *